(12) United States Patent
Pallenberg et al.

(10) Patent No.: US 11,332,893 B2
(45) Date of Patent: May 17, 2022

(54) METHOD OF RESURFACING A SPORTS COURT

(71) Applicant: C & M Surfaces, LLC, Madison, CT (US)

(72) Inventors: Carvin Pallenberg, Madison, CT (US); Mark Brogan, Berwyn, PA (US)

(73) Assignee: C & M Surfaces, LLC, Madison, CT (US)

( * ) Notice: Subject to any disclaimer, the term of this patent is extended or adjusted under 35 U.S.C. 154(b) by 46 days.

(21) Appl. No.: 16/714,207

(22) Filed: Dec. 13, 2019

(65) Prior Publication Data
US 2021/0180266 A1    Jun. 17, 2021

(51) Int. Cl.
*E01C 11/00*    (2006.01)
*B32B 37/12*    (2006.01)
*E01C 13/04*    (2006.01)

(52) U.S. Cl.
CPC ............ *E01C 11/005* (2013.01); *B32B 37/12* (2013.01); *E01C 13/045* (2013.01); *B32B 2037/1253* (2013.01)

(58) Field of Classification Search
CPC ..... E01C 11/005; E01C 13/045; B32B 37/12; B32B 2037/1253
See application file for complete search history.

(56) References Cited

U.S. PATENT DOCUMENTS

| | | |
|---|---|---|
| 3,932,051 A | 1/1976 | Cleary |
| 3,993,412 A | 11/1976 | Drane |
| 4,113,401 A | 9/1978 | McDonald |
| 4,897,302 A | 1/1990 | Bull |
| 5,185,013 A | 2/1993 | Martin |
| 5,411,352 A | 5/1995 | Eren |
| 5,429,453 A | 7/1995 | Stroud |
| 5,464,304 A | 11/1995 | Dittmar |
| 6,291,368 B1 | 9/2001 | Lee |

(Continued)

FOREIGN PATENT DOCUMENTS

| | | |
|---|---|---|
| EP | 0358209 B1 | 8/1992 |
| GB | 436509 A | 10/1935 |

(Continued)

OTHER PUBLICATIONS

JPH10183512A Machine Translation of Description (EPO/Google) (Year: 2021).*

(Continued)

*Primary Examiner* — Cynthia L Schaller
(74) *Attorney, Agent, or Firm* — Troutman Pepper Hamilton Sanders LLP (Rochester)

(57) ABSTRACT

Disclosed herein is a method of resurfacing a sports court. This method involves applying a first adhesive to an existing sports court; curing the first adhesive to a tacky state; applying a thin fabric onto the first adhesive, wherein the thin fabric has a first side applied to the first adhesive and a second side opposite the first side and wherein the thin fabric is capable of releasing from the tacky state of the first adhesive; applying a second adhesive to the second side of the fabric; applying an elastic mat on top of the second adhesive, wherein the elastic mat has a first side applied to the second adhesive and a second side opposite the first side; and applying a sealer to the second side of the elastic mat.

12 Claims, 2 Drawing Sheets

(56) References Cited

U.S. PATENT DOCUMENTS

| | | |
|---|---|---|
| 6,450,729 B1 | 9/2002 | Clapp |
| 6,786,674 B1 | 9/2004 | Hanks |
| 7,168,887 B1 | 1/2007 | Rossi |
| 7,396,185 B2 | 7/2008 | Rossi |
| 7,597,503 B2 | 10/2009 | Hinding et al. |
| 8,876,428 B2 | 11/2014 | Pallenberg |
| 2003/0215603 A1 | 11/2003 | Lee |
| 2004/0120765 A1 | 6/2004 | Jones, IV et al. |
| 2006/0123736 A1 | 6/2006 | Futterman |
| 2010/0014915 A1 | 1/2010 | Hinding et al. |
| 2014/0270951 A1* | 9/2014 | Pallenberg ............ E01C 11/005 404/75 |
| 2018/0200608 A1 | 7/2018 | Sadick et al. |

FOREIGN PATENT DOCUMENTS

| | | |
|---|---|---|
| GB | 2346331 B | 8/2000 |
| JP | H10183512 A * | 7/1998 |
| KR | 101707099 B1 | 2/2017 |
| WO | 2013/120122 A1 | 8/2013 |

OTHER PUBLICATIONS

Eternabond website http://web.archive.org/web/20060311111434/www.eternabond.com (http://web.archive.org/web/20060311111853/www.eternabond.com/faq.htm, http://web.archive.org/web/20060311112356/www.eternabond.com/tech/WebSeal.pdf; http://web.archive.org/web/20060311111539/www.eternabond.com/detail.asp?id=ebwbs; http://web.archive.org/web/20060311.

* cited by examiner

METHOD OF RESURFACING A SPORTS COURT

FIELD

The invention disclosed herein is a method of resurfacing a sports court, such as a tennis court.

BACKGROUND

Tennis courts, basketball courts, volleyball courts, running tracks, and other athletic and recreational surfaces are known to deteriorate over time. For example, such surfaces develop cracks and become unlevel with low and high spots due to a change in the subsurface below. Such defects are, at a minimum, disruptive to athletic activities, but may also create safety hazards, particularly when the surface is being used for competitive activities.

Outdoor courts that are subject to climates with freeze-thaw cycles caused by large variations in temperature throughout the year are most susceptible to developing defects. For example, the most common problem with outdoor asphalt tennis courts today is cracks. The formation of small hairline cracks can quickly develop into larger cracks when water filters into the crack and freezes during colder temperatures. The pressure created by ice in a crack can cause larger separations which render the paved surface uneven. If cracks are left unrepaired the entire surface can be damaged, requiring replacement of large portions of or even the entire surface. Thus, development of cracks in courts and court surfaces presents a continuous maintenance problem.

Methods have been developed for repairing cracks that occur in outdoor sports courts. Such methods involve, e.g., filling cracks with a fill material that hardens to form a surface which is level with the surrounding surface. This particular method is much less expensive than resurfacing an entire section of the pavement. However, filling a crack with a fill material provides only a temporary repair, because new cracks will appear elsewhere. Also, moisture can seep into small gaps between the fill material and the crack and pressure caused by freezing and thawing can cause the crack to expand. New cracks can develop anywhere on the court surface.

Another method of repairing cracks in a paved surface or court employs a slip-sheet method, which involves the application of multiple layers of material over a crack or crevice, with at least some of the layers being allowed to slip against each other (i.e., the layers are not adhesively in contact with one another). The slip-sheet method is intended to alleviate stresses which cause crack formation by allowing movement of the repair patch near the crack. However, slip sheet methods of crack repair suffer from heaving, and the formation of bubbles and dead spots at the repair site can render the repaired paved surface uneven.

Methods of complete surface replacement are also known. According to one method, a special fabric is applied over an entire tennis court surface instead of to only individually visible cracks. The fabric is purposely not bonded to the court surface so as to allow the base to expand and contract at will. The problem with such a system is that air bubbles can form under the fabric to create dead spots that render the court surface uneven and unplayable.

Similar problems are seen with courts constructed from a cushion material overlaid onto a concrete or asphalt surface. The cushion material is applied to the underlying concrete or asphalt surface, and moisture that accumulates between the cushion material and the underlying concrete or asphalt surface heats up during warm weather and creates steam that causes air bubbles under the court surface. These air bubbles cause dead spots on the court surface.

U.S. Pat. No. 8,876,428 to Pallenberg describes a method of repairing a court surface. This method involves, among other things, applying multiple, alternating layers of sand and binder. However, this method is subject to developing bubbles in the alternating sand and binder layers, which can result in dead spots in the resurfaced or repaired court. In addition, this method is labor intensive, requires specialty equipment, and does not have high resiliency properties.

The present invention is directed to overcoming these and other deficiencies in the art.

SUMMARY

One aspect of the invention relates to a method of resurfacing a sports court. This method involves applying a first adhesive to an existing sports court; curing the first adhesive to a tacky state; applying a thin fabric onto the first adhesive, wherein the thin fabric has a first side applied to the first adhesive and a second side opposite the first side and wherein the thin fabric is capable of releasing from the tacky state of the first adhesive; applying a second adhesive to the second side of the fabric; applying an elastic mat on top of the second adhesive, wherein the elastic mat has a first side applied to the second adhesive and a second side opposite the first side; and applying a sealer to the second side of the elastic mat.

The sports court resurfacing method described herein is an improvement over other methods in that it avoids or prevents the formation of bubbles that create dead spots in the court. The inventive method creates a resurfaced sports court that has a consistent cushion thickness, is easier to install than other methods, and costs less in material and installation time. The inventive method can be carried out in about 2 days, whereas other court resurfacing methods can take as long as 8-10 days.

In the inventive method described herein, resurfacing layers formed by a fabric glued to one side of an elastic mat eliminates expansion and contraction of the elastic mat caused by temperature changes and prevents cracking or tearing of the elastic mat due to its ability to release itself when movement in the underlying surface (e.g., asphalt or concrete) occurs.

DETAILED DESCRIPTION

Figure 1:
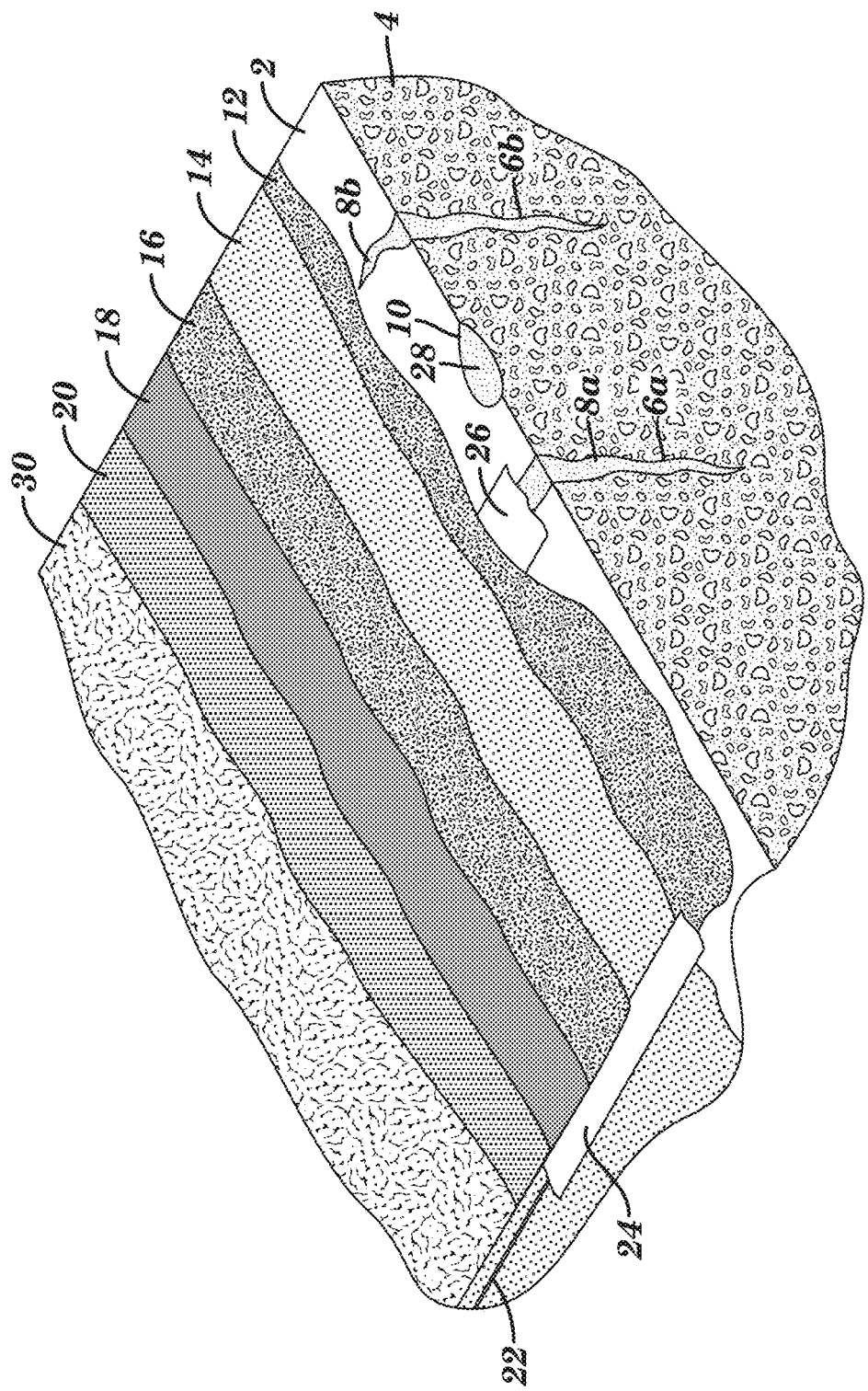
FIG. 1 is a cross-sectional, perspective, peeled-away view of layers applied to a court surface according to one embodiment of a method of repairing a court surface described herein.

The invention disclosed herein relates generally to a method of resurfacing a sports court, particularly the surface of athletic courts, such as tennis courts, pickleball courts, basketball courts, volleyball courts, or running tracks. According to the method described herein, court surfaces with cracks, uneven surfaces, dead spots, etc., can be resurfaced to eliminate such defects and to prevent the formation of such defects. The method described herein involves, in general, a layered system of materials and adhesives that adhere to, but are capable of releasing from and re-adhering to an underlying existing concrete or asphalt court.

One aspect of the invention relates to a method of resurfacing a sports court. This method involves applying a first adhesive to an existing sports court; curing the first adhesive to a tacky state; applying a thin fabric onto the first adhesive, wherein the thin fabric has a first side applied to the first adhesive and a second side opposite the first side and wherein the thin fabric is capable of releasing from the tacky state of the first adhesive; applying a second adhesive to the second side of the fabric; applying an elastic mat on top of the second adhesive, wherein the elastic mat has a first side applied to the second adhesive and a second side opposite the first side; and applying a sealer to the second side of the elastic mat.

Court surfaces suitable for resurfacing according to the method described herein may be formed of any of a variety of pavement materials including, without limitation, asphalt and concrete materials. Other pavement materials which are subject to cracking and other defects may also be resurfaced by the method disclosed herein.

In one embodiment, the method described herein involves resurfacing a sports court to eliminate or repair cracks in the court surface, to create a smooth, playable court surface. The depth of a crack may vary from a shallow surface crack which extends only a short distance into the court surface and/or its underlying concrete or asphalt material, to a more penetrating crack which extends deeply into and/or through the court surface and any underlying concrete or asphalt material.

In one embodiment, the court to be resurfaced or repaired is first prepared for resurfacing or repair. Preparing a court for resurfacing according to the inventive method may involve cleaning the court surface and any cracks of any loose debris, such as dust, dirt, gravel, crumbled asphalt or concrete, or any other type of loose debris material. This can be accomplished by blowing compressed air onto the court surface and/or into cracks, by applying a vacuum, or by brushing or sweeping the surface and/or cracks to remove the debris. In one embodiment, the court surface is cleaned with a power-washer.

For a court surface with existing cracks, once the cracks are cleaned for lose debris, the cracks may be filled with a fill material, such as a concrete and/or binder material. A suitable fill material for preparing cracks for resurfacing according to the inventive method includes, without limitation, a mixture of sand, cement, and latex, although other materials may also be used. In one embodiment, cracks are filled with a 3000 psi concrete material. In one embodiment, cracks are filled with fill material to a level even or substantially even with the surrounding court surface. After the fill material dries, it can be scraped, ground, sanded, or buffed flush with the surrounding court surface to level the filled cracks with the surrounding court surface. The court surface and fill material surface can then be cleaned (e.g., broomed or blown) of dust and/or other debris. In one embodiment, the paved surface and fill material surface are dry and at a temperature of about 60° F. or warmer prior to carrying out other steps of the inventive method.

Once existing cracks are filled and leveled with the surrounding court surface, it may be desirable to cover the leveled, filled cracks with a thin tape, for example, a crack-sealing tape. One suitable example of a crack-sealing tape includes, without limitation, Performance Court Crack Barrier tape, although other tapes and materials may also be used. In one embodiment, the crack-sealing tape is watertight and has the ability to remain flexible at temperatures as low as about minus 70° F. to more than 200° F. Other watertight materials which are flexible and pliable at a wide range of temperatures may also be used. In one embodiment, the crack-sealing tape has a thickness of about 0.1 mm to about 2 mm, about 0.25 mm to about 1.75 mm, about 0.5 mm to about 1.5 mm, about 0.75 mm to about 1.25 mm, or about 1 mm.

In one embodiment, the crack-sealing tape is applied to the court surface above cracks by using, e.g., a linoleum roller to provide a solid bond between the crack sealing tape and the existing court surface.

After the court is prepared by any one or more of filling, leveling, and covering existing cracks, or any other preparation, including skipping any special preparation of existing cracks, the court surface may then be prepared, if desired, by leveling the court surface where needed. This may include, for example, repairing low spots (see, e.g., low spot 10 in FIG. 1) by filling low spots with a filler material (see, e.g., filler material 28 in FIG. 1). For example, low spots may be filled with a filler material comprising a mixture of Portland cement, sand, and court patch binder, although other materials may also be used. Filled spots can then be sanded smooth, e.g., with a motorized floor sander. For existing high spots, these can be removed (i.e., made level with the surrounding court surface) by grinding or sanding.

Figure 2:
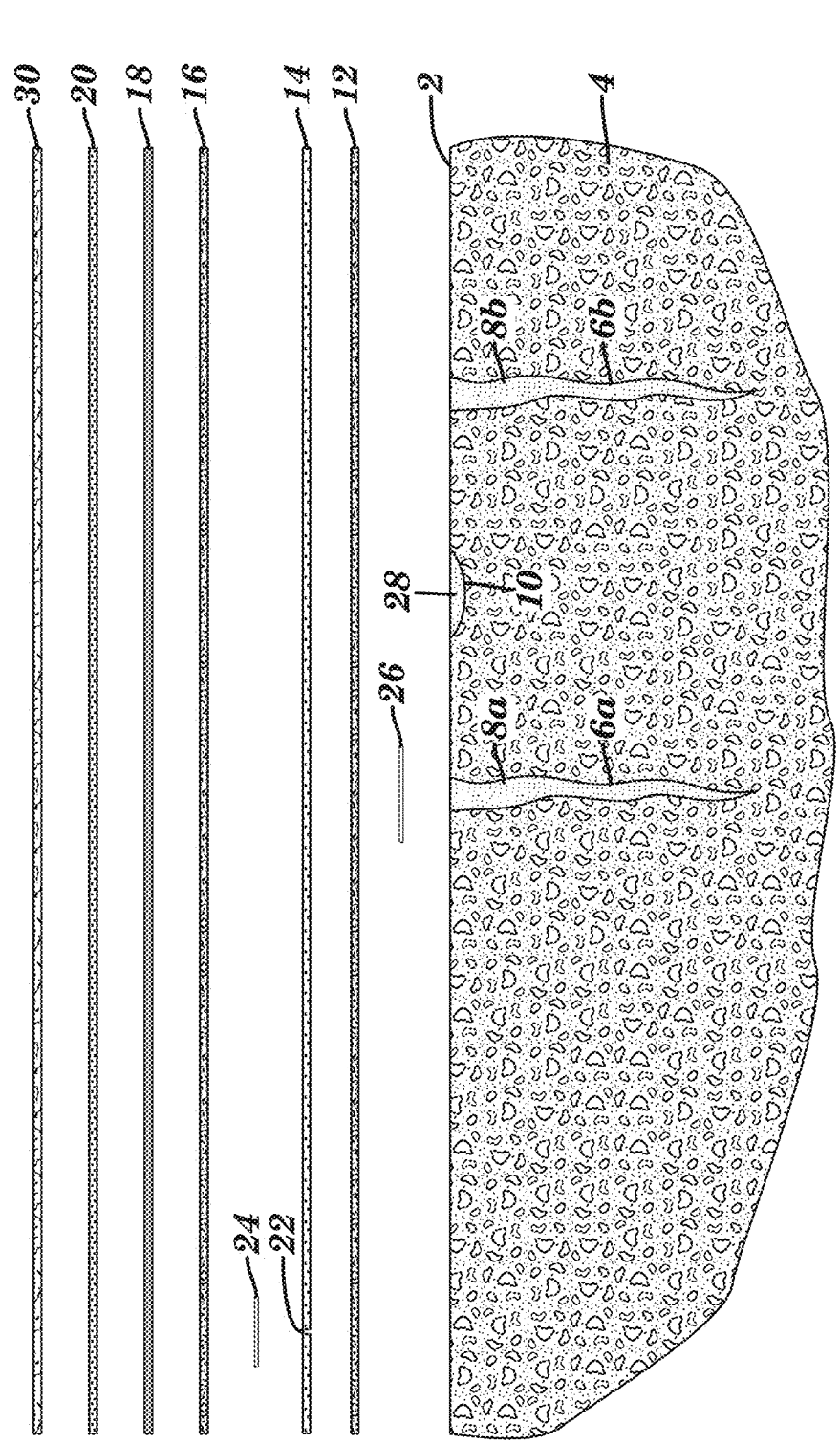
FIG. 2 is a cross-sectional, exploded view of a court surface repaired according to one embodiment of the inventive method described herein.

Referring now to FIG. 1 and FIG. 2, illustrated is court surface 2 and underlying concrete or asphalt surface 4 with various layers applied to court surface 2 to resurface court surface 2 and underlying concrete or asphalt surface 4 according to the inventive method described herein. As illustrated, cracks 6a and 6b in court surface 2 and underlying concrete or asphalt 4 have been filled with binder/filler material 8a and 8b, respectively.

Crack-sealing tape 26 has been applied to cover binder/filler material 8a in crack 6a. In one embodiment, crack-sealing tape 26 is applied using a linoleum roller to provide a solid bond between tape 26 and the existing court surface 2.

According to one embodiment, first adhesive 12 is applied onto court surface 2, including onto crack-sealing tape 26, if present. While only a portion of court surface 2 is shown to have adhesive 12, first adhesive 12 may be applied to the entire court surface 2. In one embodiment, first adhesive 12 is a liquid adhesive. Suitable liquid adhesives for first adhesive 12 may include any adhesive that does not cure to a hardened or dried state, but remains tacky, even when fully cured. Such adhesives are known to persons of ordinary skill in the art.

In one embodiment, first adhesive 12 is applied by flood coating court surface 2 under conditions to saturate court surface 2. Application of first adhesive 12 may be carried out using a sprayer or rubber squeegee. In one embodiment, the amount of first adhesive 12 applied to court surface 2 is about 0.0035 gal/ft$^2$, or 0.0034-0.0036 gal/ft$^2$, 0.0033-0.0037 gal/ft$^2$, 0.0032-0.0038 gal/ft$^2$, 0.0031-0.0039 gal/ft$^2$, 0.0030-0.0040 gal/ft$^2$, or up to 0.0041 gal/ft$^2$, 0.0042 gal/ft$^2$, 0.0043 gal/ft$^2$, 0.0044 gal/ft$^2$, or up to 0.0045 gal/ft$^2$. In one embodiment, after first adhesive 12 is applied to court surface 2 it is allowed to cure or "dry" until it becomes tacky. In one embodiment, first adhesive 12 remains tacky even after completely drying.

In the resurfacing method described herein, after first adhesive 12 is applied to court surface 2, court surface 2 (and first adhesive 12) is then covered with fabric 14. Fabric 14 has a first side applied to the first adhesive 12 and a second side opposite the first side. In one embodiment, fabric 14 is placed directly ont the tack surface of first adhesive 12 and then smoothed out with, e.g., a broom. In one embodiment, fabric 14 is a thin fabric that simply creates a thin sheet to which a subsequent layer (described infra) may be adhesively attached. Various fabric types may be used, but a typical fabric suitable for the inventive method described herein is a cloth formed of textile fibers (organic, synthetic, or blends thereof) by standard methods, e.g., weaving.

Fabric 14 may need to be applied to court surface 2 in commercial sheets available in only limited widths, which means the sheets may need to be arranged side-by-side to each other to cover the entire width or length of a court being repaired. Under such circumstances, seams would be created in fabric 14, or portions where two edges of fabric 14 meet. In other court surface repair methods, fabric seems needed to be sealed or joined with a seaming tape. In contrast, the inventive method described herein does not require a seaming tape to seal or join edges of fabric. Instead, the method of the present disclosure may have fabric edges that overlap, or that have slight gaps, neither of which compromise the resurfaced court according to the inventive method described herein. In addition, in other court surface repair methods, it may have been desirable when laying a fabric layer to first snap a chalk line on an adhesive parallel from the court edge at a distance equal to or about equal to the width of the sheet of the fabric to ensure that the fabric 14 is laid down straight. This level of precision is not required in the inventive method described herein. In the inventive method described herein, such features do not create unlevel court surfaces, due to the nature of the subsequent layers described infra.

Since first adhesive 12 is tacky, fabric 14 adheres to court surface 2 (and any crack-sealing tape 26). However, fabric 14 may also become detached (or it may temporary release from, or portions thereof may temporarily release) from court surface 2 (and any crack-sealing tape 26) under stressful conditions, and then re-adhere to court surface 2 (and any crack-sealing tape 26). Thus, contrary to court resurfacing methods that involve a detached, floating fabric layer, the resurfacing method described herein has an underlying fabric layer that adheres to the underlying existing court surface.

In the resurfacing method described herein, a second adhesive 16 is applied to the second side of fabric 14. Second adhesive 16 may be a different adhesive than first adhesive 12. In one embodiment, second adhesive 16 is a two-part polyurethane adhesive, which is different (i.e., has a different chemical formula) than first adhesive 12. Second adhesive 16 may be applied in any suitable manner, including as described supra, for application of first adhesive 12. In one embodiment, second adhesive 16 is troweled onto fabric 14 using a notched trowel. In one embodiment, the amount of second adhesive 16 applied to fabric 14 is about 0.21 gal/ft$^2$, or 0.20-0.22 gal/ft$^2$, 0.19-0.23 gal/ft$^2$, 0.18-0.24 gal/ft$^2$, 0.17-0.25 gal/ft$^2$, 0.16-0.26 gal/ft$^2$, 0.15-0.27 gal/ft$^2$, or up to 0.28 gal/ft$^2$, 0.29 gal/ft$^2$, 0.30 gal/ft$^2$, 0.31 gal/ft$^2$, 0.32 gal/ft$^2$, 0.33 gal/ft$^2$, 0.34 gal/ft$^2$, or 0.35 gal/ft$^2$. In one embodiment, second adhesive 16 is applied thicker than first adhesive 12. In other words, a higher volume of second adhesive 16 may be applied to fabric 14 than the volume of first adhesive 12 applied to court surface 2.

As further illustrated in FIG. 1 and FIG. 2, elastic mat 18 is applied as a subsequent layer to second adhesive 16. Elastic mat 18 has a first side applied to second adhesive 16 and a second side opposite the first side. Suitable elastic mats for use in the resurfacing method described herein include, without limitation, a sports flooring elastic mat known as Regupol®, which is made of rubber and polyurethane. In one embodiment, elastic mat 18 has a thickness of 6 mm, or about 6 mm. Suitable thickness of elastic mat 18 include elastic mats that are 1 mm, 2 mm, 3 mm, 4 mm, 5 mm, 6 mm, 7 mm, 8 mm, 9 mm, 10 mm, 11 mm, or 12 mm thick, or any thickness or thickness range therein.

In one embodiment, elastic mat 18 and fabric 14 become, essentially, a single unit, bound together (i.e., sandwiched) by second adhesive 16. Second adhesive 16 is of a quality that makes it possible for elastic mat and fabric 14 to essentially become a single unit. Thus, in one embodiment, elastic mat 18 and fabric 14, bound by second adhesive 16, are able to move slightly, as a single unit, relative to court surface 2, as permitted by the cured "tacky" nature of first adhesive 12. In other words, in one embodiment, movement relative to court surface 2 of elastic mat 18 and fabric 14, as bound by second adhesive 16, is limited but not totally prevented by first adhesive 12. Allowance of some movement of elastic mat 18 relative to court surface 2 prevents elastic mat 18 from cracking or tearing due to forces created by expansion and/or contraction of underlying court surface 2. Thus, the resurfacing method described herein is advantageous over other resurfacing methods that adhere an elastic mat directly to an underlying court with an adhesive that does not permit movement.

In one embodiment, elastic mat 18 is kept from expanding and contracting by adherence to underlying adhesive 16 and fabric 14 and a sealer applied on top of elastic mat 18, as described infra.

In the resurfacing method described herein, sealer 20 is applied to the second side of elastic mat 18. A suitable sealer is a Pro-Cushion® base mat sealer or any other sealer that is elastic and will not crack after setting.

Application of sealer 20 may be carried out using a rubber squeegee, or any other suitable method, such as by sprayer or smooth trowel. In one embodiment, the amount of sealer 20 applied to elastic mat 18 is about 0.009 gal/ft$^2$, or 0.008-0.010 gal/ft$^2$, 0.007-0.011 gal/ft$^2$, 0.006-0.012 gal/ft$^2$, 0.005-0.013 gal/ft$^2$, 0.004-0.014 gal/ft$^2$, or up to 0.015 gal/ft$^2$, 0.016 gal/ft$^2$, 0.017 gal/ft$^2$, 0.018 gal/ft$^2$, 0.019 gal/ft$^2$, or 0.020 gal/ft$^2$.

In carrying out the resurfacing method described herein, in one embodiment, after sealer 20 is applied a first flexible acrylic re-surfacer is applied to sealer 20 and then a second flexible acrylic re-surfacer is applied onto the first acrylic re-surfacer (both acrylic re-surfacers being represented in FIG. 1 and FIG. 2 as layer 30). In one embodiment, acrylic 30 is applied to sealer 20 in an amount of about 0.036 gal/ft$^2$, or 0.035-0.037 gal/ft$^2$, 0.034-0.038 gal/ft$^2$, 0.033-0.039 gal/ft$^2$, 0.032-0.040 gal/ft$^2$, 0.031-0.041 gal/ft$^2$, 0.030-0.42 gal/ft$^2$, or up to about 0.043 gal/ft$^2$, 0.044 gal/ft$^2$, 0.045 gal/ft$^2$, or 0.046 gal/ft$^2$.

To complete the court resurfacing, two or more color coatings may be applied to acrylic 30, as desired, followed by, e.g., lines to properly mark the court. In one embodiment, the color coatings are flexible color coatings, which are well known in the art.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A method of resurfacing a sports court, said method comprising:

applying a first adhesive directly to an existing sports court;

curing the first adhesive to a tacky state;
applying a thin fabric directly onto the first adhesive to form a thin fabric layer, wherein the thin fabric layer has a first side applied directly to the first adhesive and a second side opposite the first side, and wherein the thin fabric layer is capable of releasing from the tacky state of the first adhesive;
applying a second adhesive directly to the second side of the thin fabric layer;
applying an elastic mat directly on top of the second adhesive to form an elastic mat layer, wherein the elastic mat layer has a first side applied directly to the second adhesive and a second side opposite the first side, and wherein the elastic mat layer is a single layer of material comprising rubber and polyurethane; and
applying a sealer directly to the second side of the elastic mat layer;
wherein said method is carried out to form a resurfaced sports court comprising the thin fabric layer as the only layer of fabric of the resurfaced sports court and the elastic mat layer as the only elastic mat layer of the resurfaced sports court.

2. The method according to claim 1 further comprising: preparing the court surface for resurfacing.

3. The method according to claim 2, wherein said preparing is selected from the group consisting of filling existing cracks in the court surface with a concrete and/or binder material; leveling the filled cracks with the court surface; covering the leveled, filled cracks with a crack-sealing tape; leveling low spots in the court surface; cleaning the court surface; and any of combination thereof.

4. The method according to claim 3, wherein the crack-sealing tape has a thickness of about 1 mm.

5. The method according to claim 1, wherein said applying the first adhesive is carried out under conditions to saturate the existing sports court.

6. The method according to claim 1, wherein the first adhesive permits release and re-adherence of the fabric to the existing sports court.

7. The method according to claim 1, wherein said applying the first adhesive is carried out with one or more of a sprayer or squeegee.

8. The method according to claim 1, wherein said applying the second adhesive is carried out with one or more of a sprayer, squeegee, or notched trowel.

9. The method according to claim 1, wherein the amount of second adhesive applied is greater than the amount of first adhesive applied.

10. The method according to claim 1, wherein the fabric and the elastic mat form a single unit via the second adhesive.

11. The method according to claim 1 further comprising: applying a flexible acrylic to the sealed elastic mat.

12. The method according to claim 11 further comprising: applying one or more flexible coatings to the flexible acrylic.

* * * * *